United States Patent
Kawashima (10) Patent No.: US 10,116,828 B2
(45) Date of Patent: Oct. 30, 2018

(54) IMAGE COMMUNICATION APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Yasuaki Kawashima, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/658,510

(22) Filed: Jul. 25, 2017

(65) Prior Publication Data

US 2018/0041658 A1     Feb. 8, 2018

(30) Foreign Application Priority Data

Aug. 4, 2016   (JP) ................. 2016-154023

(51) Int. Cl.
*H04M 11/00*       (2006.01)
*H04N 1/32*        (2006.01)
*H04N 1/00*        (2006.01)

(52) U.S. Cl.
CPC ....... *H04N 1/3209* (2013.01); *H04N 1/00206* (2013.01); *H04N 1/00832* (2013.01); *H04N 2201/0093* (2013.01); *H04N 2201/3209* (2013.01)

(58) Field of Classification Search
CPC ............. H04N 1/3209; H04N 1/00832; H04N 1/00206; H04N 2201/3209; H04N 2201/0093; H04N 1/32048; H04N 1/32096

USPC .................................... 379/100.14; 358/440
See application file for complete search history.

(56) References Cited

U.S. PATENT DOCUMENTS

| | | | | |
|---|---|---|---|---|
| 6,169,799 B1* | 1/2001 | McIntosh | ........ | H04M 1/274566 379/354 |
| 8,260,866 B2* | 9/2012 | Kobayashi | ............. | H04N 1/333 358/1.15 |
| 2004/0105599 A1* | 6/2004 | Siddle | ................ | H04N 1/32771 382/317 |
| 2010/0323670 A1 | 12/2010 | Kaida | | |
| 2015/0281043 A1 | 10/2015 | Kawashima | | |
| 2017/0013161 A1 | 1/2017 | Kawashima | | |

FOREIGN PATENT DOCUMENTS

WO    2008/069054 A1    6/2008

* cited by examiner

*Primary Examiner* — Stella Woo
(74) *Attorney, Agent, or Firm* — Fitzpatrick, Cella, Harper & Scinto (57) ABSTRACT

If a designated transmission destination is an external line, an image communication apparatus appends an external line number and transmits image data in accordance with the transmission destination. Furthermore, in accordance with the transmission destination used when transmitting the image data, the image communication apparatus individually records, as history information for each transmitted job, the designated transmission destination and the external line number if the external line number is appended. The image communication apparatus also registers the designated transmission destination from the history information to an address book.

6 Claims, 13 Drawing Sheets

| JOB ID | EXTERNAL LINE NUMBER | INPUT NUMBER |
|---|---|---|
| 1 | 0 | 044-XXX-YYYY |
| 2 | 0 | 029-AAA-BBBB |
| 3 |  | 111 |
| 4 |  | 222 |

IMAGE COMMUNICATION APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image communication apparatus which performs power saving control, a control method thereof, and a non-transitory computer-readable storage medium.

Description of the Related Art

There is known an environment with an arrangement in which a private branch exchange (PBX) is installed, and an external line call is made by appending an external line number to a partner telephone number. Note that if a calling terminal is set to append the external line number automatically, a number to which the external line number is appended remains in a history, in addition to a number input by a user. If a call is to be made by using a number registered in the history in such an environment, an external line number is further appended to the number to which the external line number is appended, incurring a possibility incapable of calling a right partner. International Publication Ser. No. 08/069,054 Pamphlet proposes a technique of removing an external line number, that is, a part of a transmission source number that seems unnecessary when recording it in a history by checking it against a plurality of predetermined conditions. This intends to improve convenience of the history.

However, the above-described related art has a problem to be described below. The above-described related art is mainly targeted at a telephone terminal. In a facsimile (to be abbreviated as FAX hereinafter) terminal which performs FAX transmission, however, it is not preferable to record, in a history, a FAX number different from a number that has actually been called from a viewpoint that FAX transmission may lead to information leakage. On the other hand, performing FAX transmission by using the transmission history of a FAX number that succeeds in transmission provides a very useful operation system.

SUMMARY OF THE INVENTION

The present invention enables realization of a mechanism capable of using a transmission history usefully also in a FAX terminal configured to make an external line call by appending an external line number.

According to one aspect of the present invention, there is provided an image communication apparatus capable of image communication to an external line and an extension line, the apparatus comprising: a memory device that stores a set of instructions; and at least one processor that executes the instructions to: designate a transmission destination of image data, append an external line number if the designated transmission destination is the external line, transmit the image data in accordance with one of the designated transmission destination and the transmission destination to which the external line number is appended, and in accordance with the transmission destination used when transmitting the image data, individually record, as history information for each transmitted job, the designated transmission destination and the external line number if the external line number is appended.

According to another aspect of the present invention, there is provided a control method for an image communication apparatus capable of image communication to an external line and an extension line, the image communication apparatus comprising a memory device that stores a set of instructions; and at least one processor that executes the instructions, the control method comprising: designating a transmission destination of image data, appending an external line number if the designated transmission destination is the external line, transmitting the image data in accordance with one of the designated transmission destination and the transmission destination to which the external line number is appended, and in accordance with the transmission destination used when transmitting the image data, individually recording, as history information for each transmitted job, the designated transmission destination and the external line number if the external line number is appended.

According to still another aspect of the present invention, there is provided a non-transitory computer-readable storage medium storing a computer program for causing a computer to execute respective steps in a control method for an image communication apparatus capable of image communication to an external line and an extension line, the image communication apparatus comprising a memory device that stores a set of instructions; and at least one processor that executes the instructions, the control method comprising: designating a transmission destination of image data, appending an external line number if the designated transmission destination is the external line, transmitting the image data in accordance with one of the designated transmission destination and the transmission destination to which the external line number is appended, and in accordance with the transmission destination used when transmitting the image data, individually recording, as history information for each transmitted job, the designated transmission destination and the external line number if the external line number is appended.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Image Communication Apparatus>

The first embodiment of the present invention will be described below. First, the hardware arrangement of an image communication apparatus 1 according to this embodiment will be described with reference to FIG. 1. The image communication apparatus 1 includes a CPU 11, a RAM 12, a hard disk (HDD) 13, a user command input apparatus 14, a FAX modem 15, and an original reading apparatus 17. Respective blocks can exchange data via a main bus 18. An extension line telephone network 2 is connected to another device. The extension line telephone network 2 is connected to the FAX modem 15.

Figure 1:
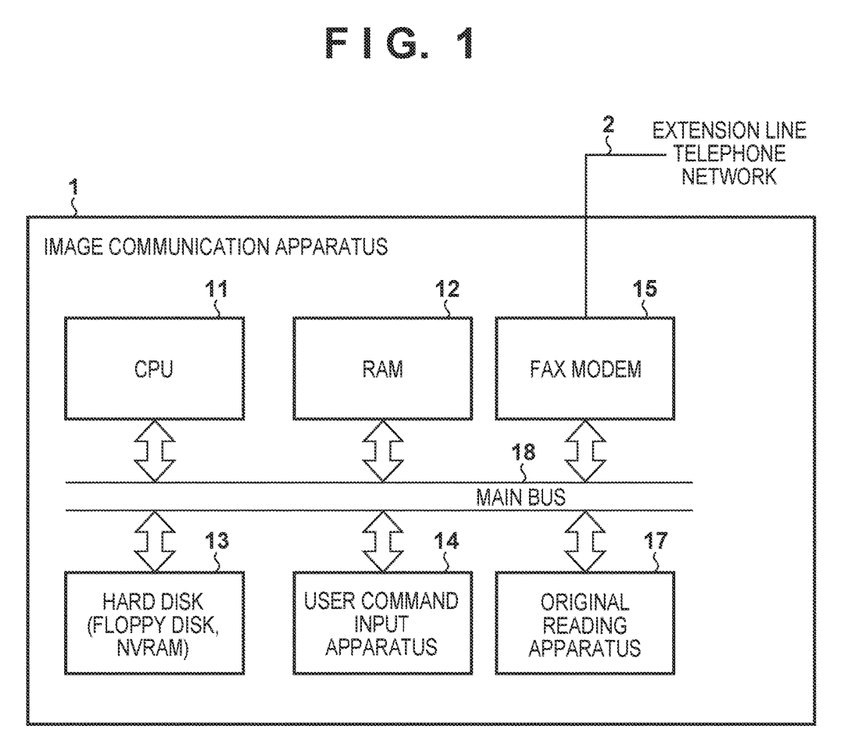
FIG. 1 is a block diagram showing an example of the hardware arrangement of an image communication apparatus according to an embodiment.

The CPU 11 generally controls the image communication apparatus 1. The RAM 12 provides the work area of the CPU 11. The HDD 13 is a hard disk (may be a NVRAM or the like) which stores control programs, various kinds of setting information, files, and the like of the present invention. The user command input apparatus 14 includes a display unit and an input unit, and provides a user interface that allows a user to make various kinds of settings via a GUI (Graphical User Interface). The FAX modem 15 transmits/receives data to/from an external FAX terminal via a public telephone line 4 (to be described later with reference to FIG. 2) by using a FAX protocol. The original reading apparatus 17 scans an original and outputs image data.

Note that in the image communication apparatus 1, the CPU 11 generally controls the RAM 12, the HDD 13, the user command input apparatus 14, the FAX modem 15, and the original reading apparatus 17 via the main bus 18 unless it is specifically stated otherwise.

<System Arrangement>

Figure 2:
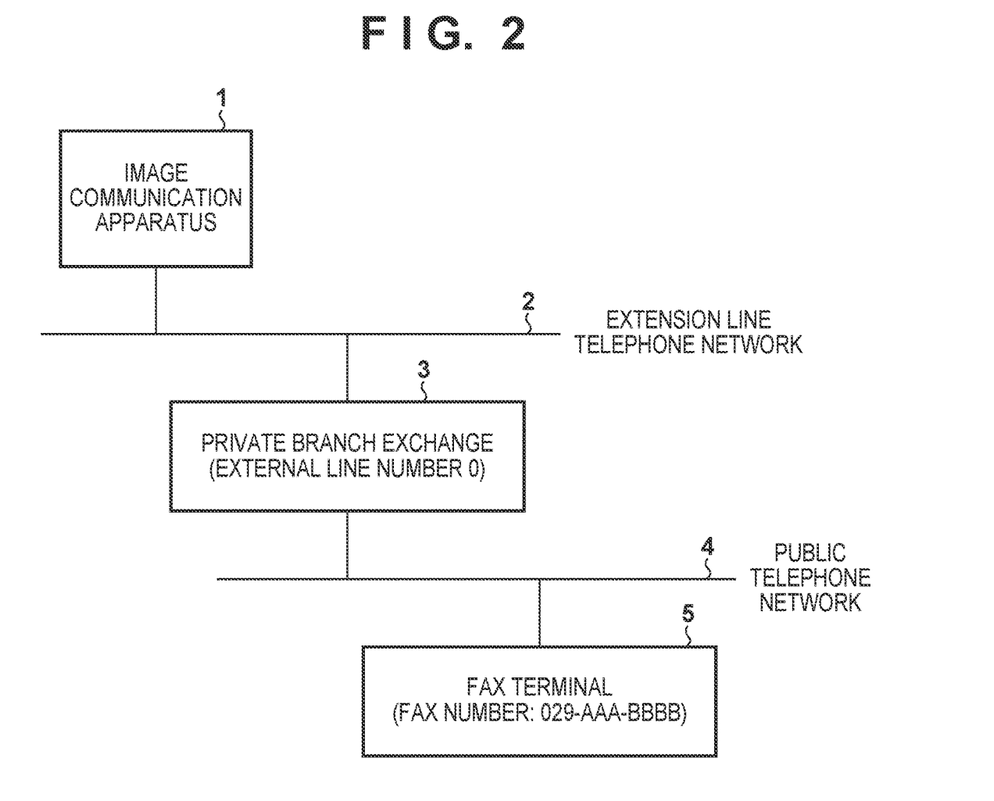
FIG. 2 is a block diagram showing an example of the system arrangement which includes an image communication apparatus 1 according to the embodiment.

An example of a system arrangement which includes the image communication apparatus 1 according to this embodiment will now be described with reference to FIG. 2. This system includes the image communication apparatus 1, a private branch exchange 3, and a FAX terminal 5. The image communication apparatus 1 is connected to the private branch exchange 3 via the extension line telephone network 2. 0 is set as an external line number in the private branch exchange 3. The private branch exchange 3 is connected, via the public telephone line 4, to the FAX terminal 5 which registers a FAX number 029-AAA-BBBB.

In this embodiment, the HDD 13 stores an address book in which a list of FAX numbers used by the image communication apparatus 1 as transmission destinations is registered, and history information which includes at least a FAX number input by the user and an external line number appended when the image communication apparatus 1 performs FAX transmission.

<Overall Processing>

Figure 3:
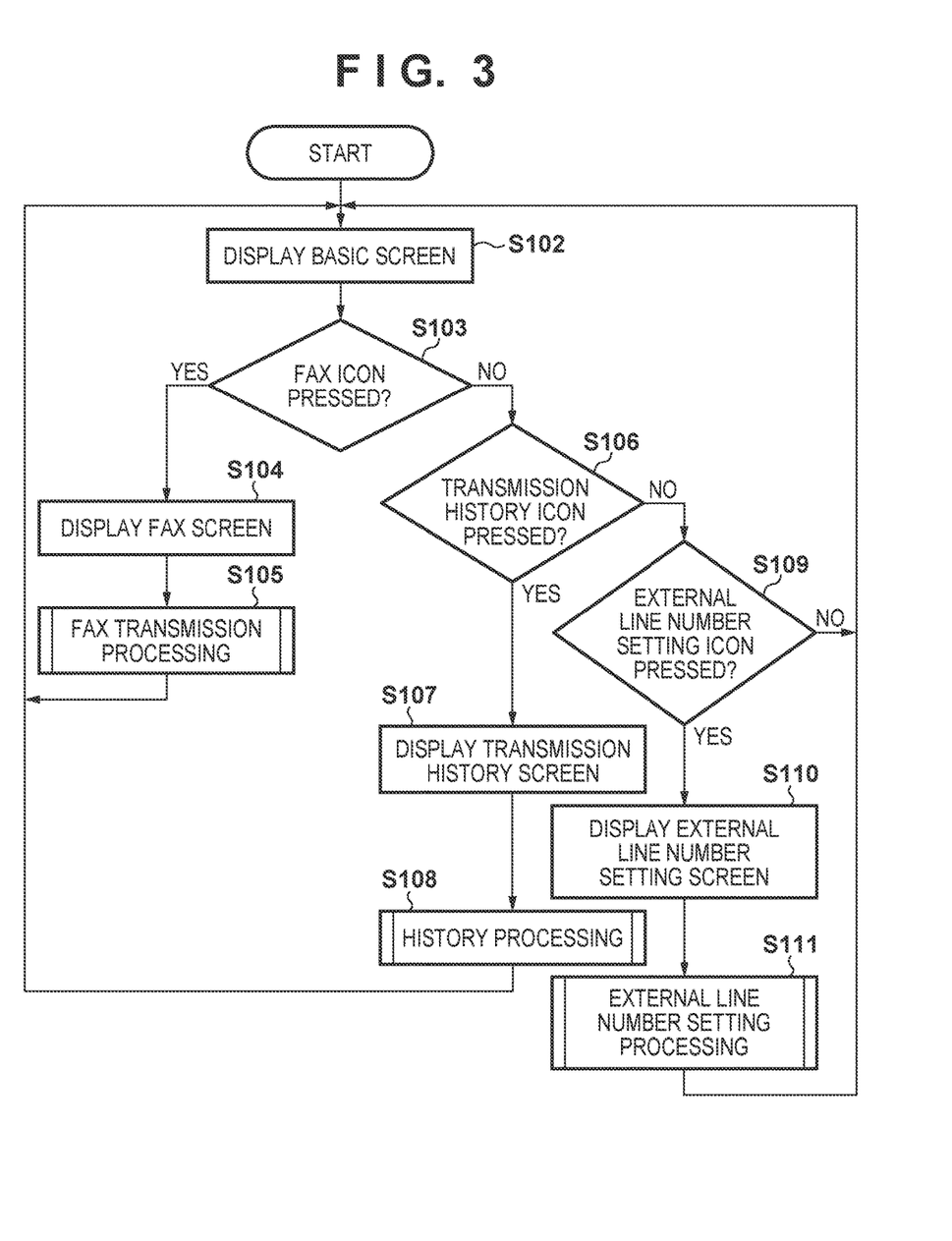
FIG. 3 is a flowchart showing an example of the processing procedure of overall processing according to the embodiment.

The processing procedure of overall processing according to this embodiment will now be described with reference to FIG. 3. Processing to be described below is implemented by causing the CPU 11 to load, onto the RAM 12, control programs stored in the HDD 13 in advance and execute them.

Figure 4:
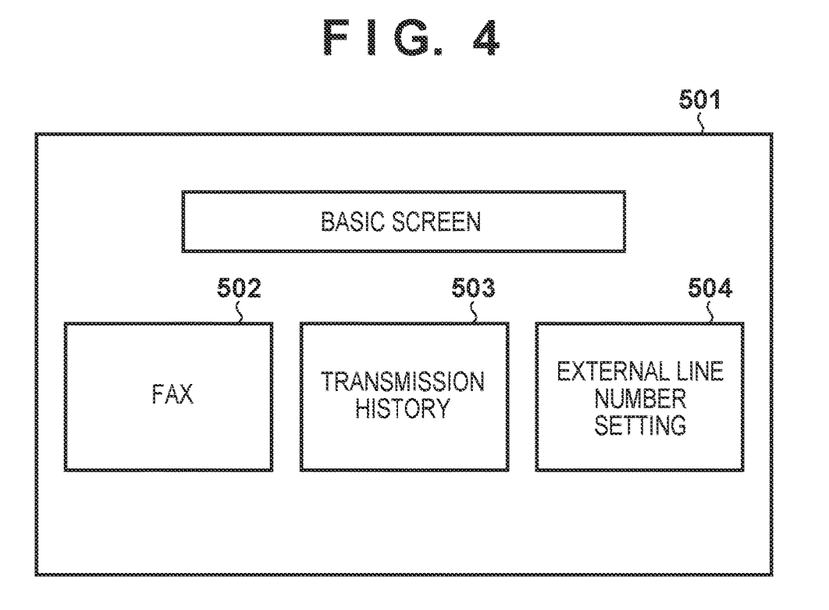
FIG. 4 is a view showing an example of a basic screen according to the embodiment.

Upon starting the processing, in step S102, the CPU 11 displays a basic screen 501 shown as an example in FIG. 4 in the display unit of the user command input apparatus 14. As shown in FIG. 4, a FAX icon 502, a transmission history icon 503, and an external line number setting icon 504 are selectably displayed on the basic screen 501. The FAX icon 502 is a button for giving an instruction for a FAX transmission function. The transmission history icon 503 is a button for displaying a transmission history so far. The external line number setting icon 504 is a button for setting an external line number.

Figure 5:
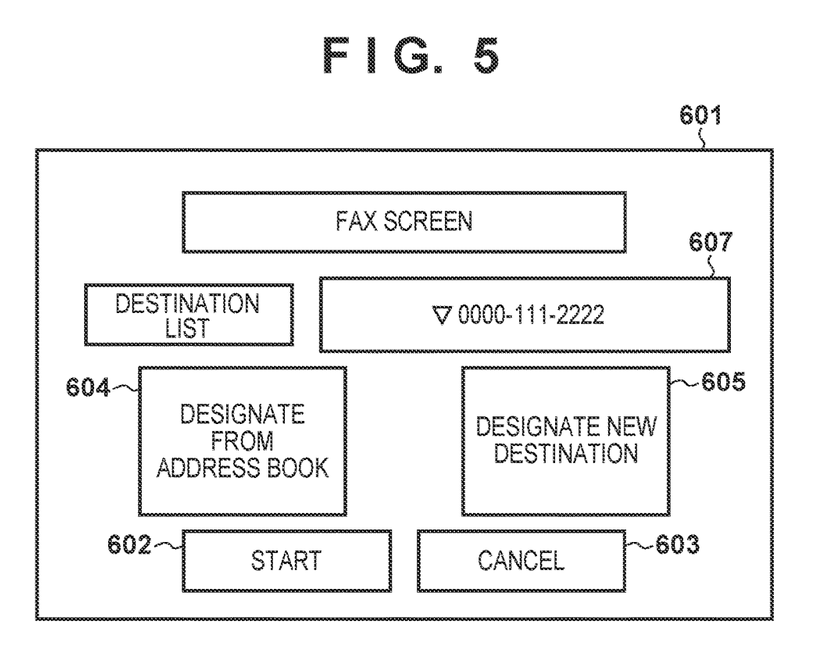
FIG. 5 is a view showing an example of a FAX screen according to the embodiment.

In step S103, the CPU 11 determines whether the FAX icon 502 is pressed. That is, the CPU 11 determines whether an instruction to invoke the FAX transmission function is performed. If the FAX icon 502 is pressed, the process advances to step S104 in which the CPU 11 displays, in the display unit, a FAX screen 601 shown as an example in FIG. 5. The CPU 11 executes, in step S105, FAX transmission processing to be described later and returns the process to step S102. As shown in FIG. 5, the FAX screen 601 includes a start button 602, a cancel button 603, an address book icon 604, a new destination icon 605, and a transmission destination field 607. The transmission destination field 607 is a field which sets a destination on which FAX transmission is performed. Upon selecting the address book icon 604, it is possible to set a transmission destination out of destinations registered in an address book. Upon selecting the new destination icon 605, it is possible to set a new transmission destination input in accordance with a user operation. Upon selecting the start button 602, FAX transmission to the set transmission destination is started. On the other hand, upon selecting the cancel button 603, contents set on the FAX screen 601 are discarded to return to a screen before changing to the FAX screen 601, for example, the basic screen 501.

Figure 6:
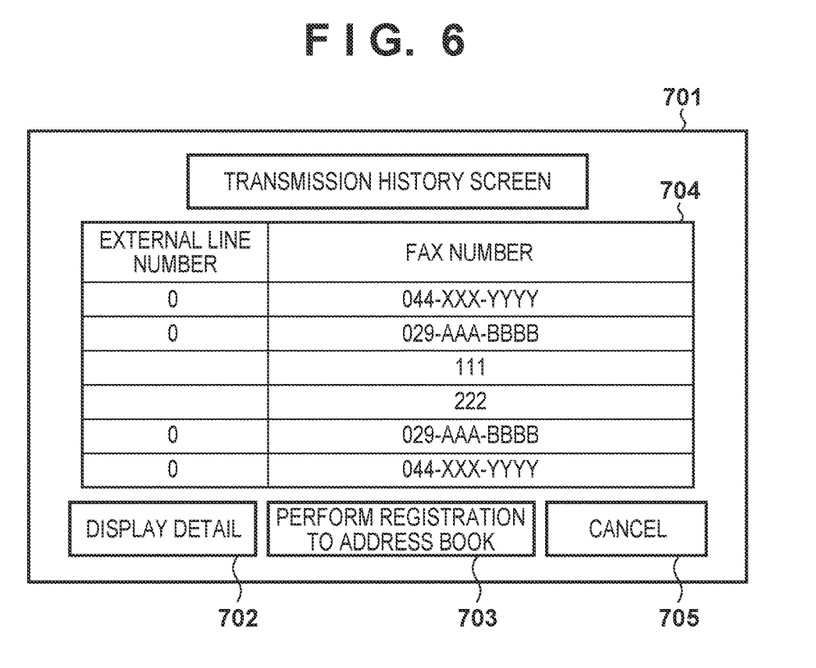
FIG. 6 is a view showing an example of a transmission history screen according to the embodiment.
Figure 12:
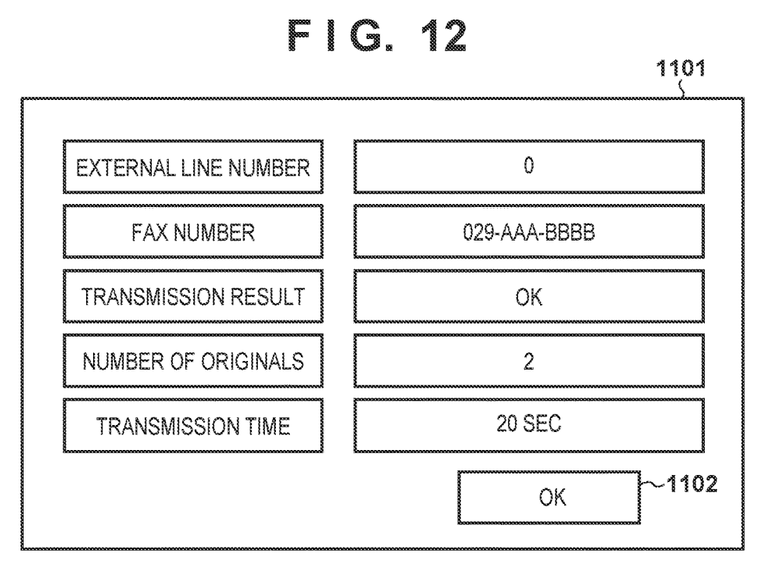
FIG. 12 is a view showing an example of a transmission history detailed screen according to the embodiment.

On the other hand, if the FAX icon 502 is not pressed, the process advances to step S106 in which the CPU 11 determines whether the transmission history icon 503 is pressed. That is, the CPU 11 determines whether an instruction to display the transmission history screen is performed. If the transmission history icon 503 is pressed, the process advances to step S107 in which the CPU 11 displays, in the display unit, a transmission history screen 701 shown as an example in FIG. 6. The CPU 11 executes, in step S108, history processing to be described later and returns the process to step S102. As shown in FIG. 6, the transmission history screen 701 includes a detailed button 702, a registration button 703, a transmission history list display field 704, and a cancel button 705. The transmission history list display field 704 displays a transmission history so far on a job basis, making it possible to select respective items. Upon operating the detailed button 702 in a state in which a predetermined item is selected, a history detailed screen 1101 shown in FIG. 12 is displayed in the display unit with respect to the selected transmission history. Upon selecting the registration button 703 in a state in which a predetermined item is selected, it is possible to register the selected transmission history to the address book. Upon selecting the cancel button 705, a screen returns to a screen before the transmission history screen 701 is displayed, that is, the basic screen 501.

Figure 7:
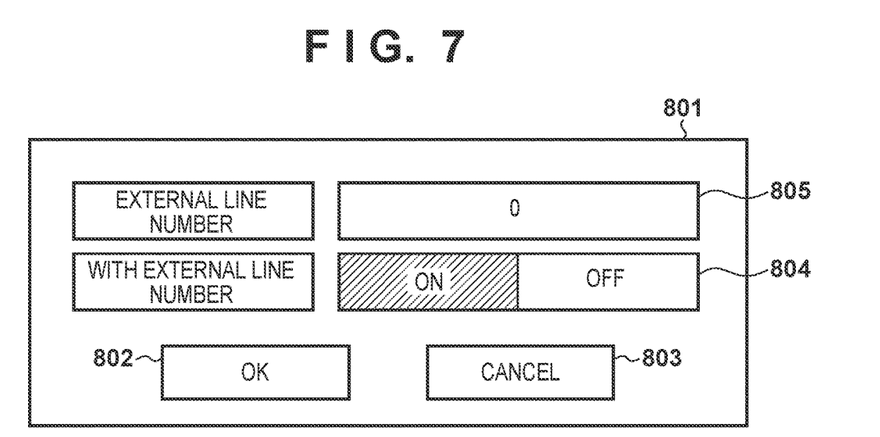
FIG. 7 is a view showing an example of an external line number setting screen according to the embodiment.

On the other hand, if the transmission history icon 503 is not pressed, the process advances to step S109 in which the CPU 11 determines whether the external line number setting icon 504 is pressed. If the external line number setting icon 504 is pressed, the process advances to step S110 in which the CPU 11 displays an external line number setting screen 801 shown as an example in FIG. 7. The CPU 11 executes, in step S111, external line number setting processing to be described later and returns the process to step S102. On the other hand, if the external line number setting icon 504 is not pressed, the CPU 11 returns the process to step S102. As shown in FIG. 7, the external line number setting screen 801 includes an OK button 802, a cancel button 803, an external line number addition setting field 804, and an external line number designation field 805. In the external line number addition setting field 804, it is possible to set whether to append an external line number automatically. In the external line number designation field 805, it is possible to set an external line number, for example, "0". Each of the OK button 802 and the cancel button 803 is a button which finalizes or cancels the contents set in the external line number addition setting field 804 and the external line number designation field 805.

<FAX Transmission Processing>

Figure 8A:
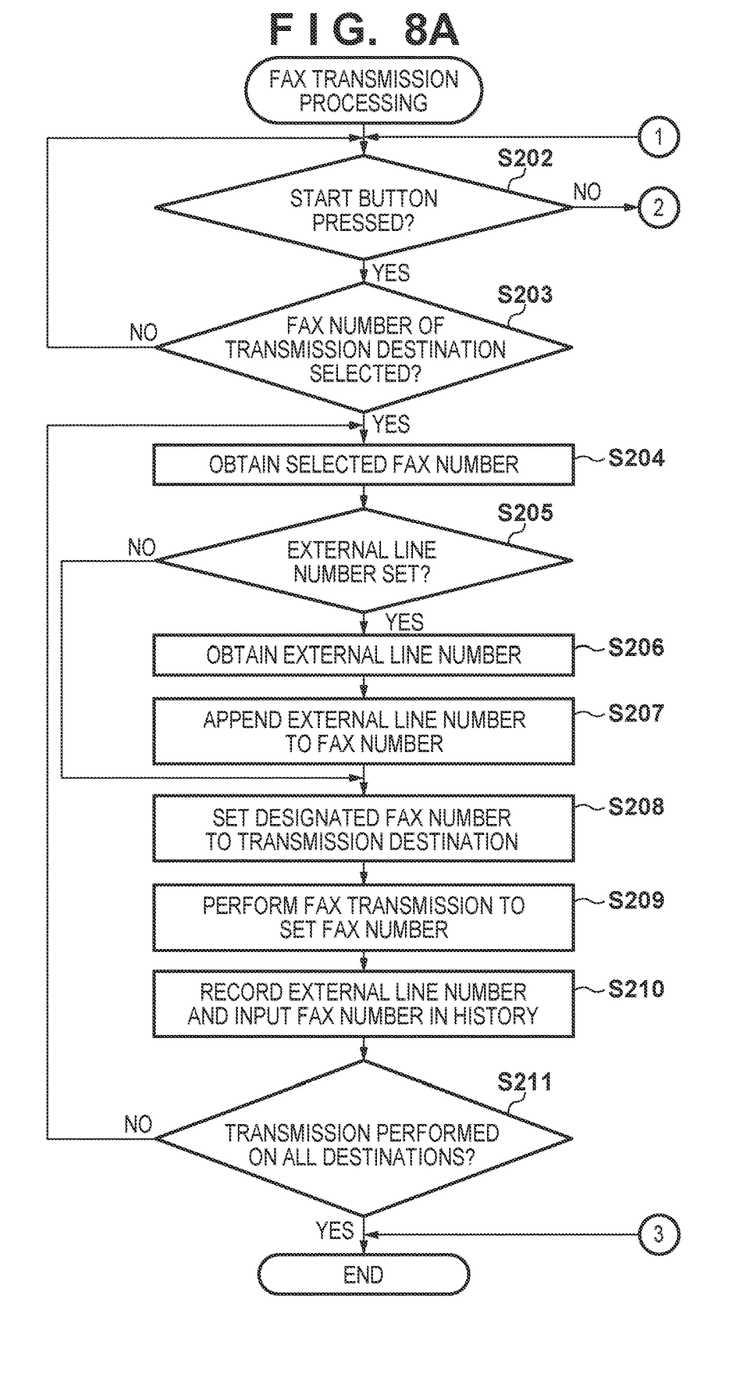
FIGS. 8A-8C are flowcharts showing an example of FAX transmission processing according to the embodiment.
Figure 8B:
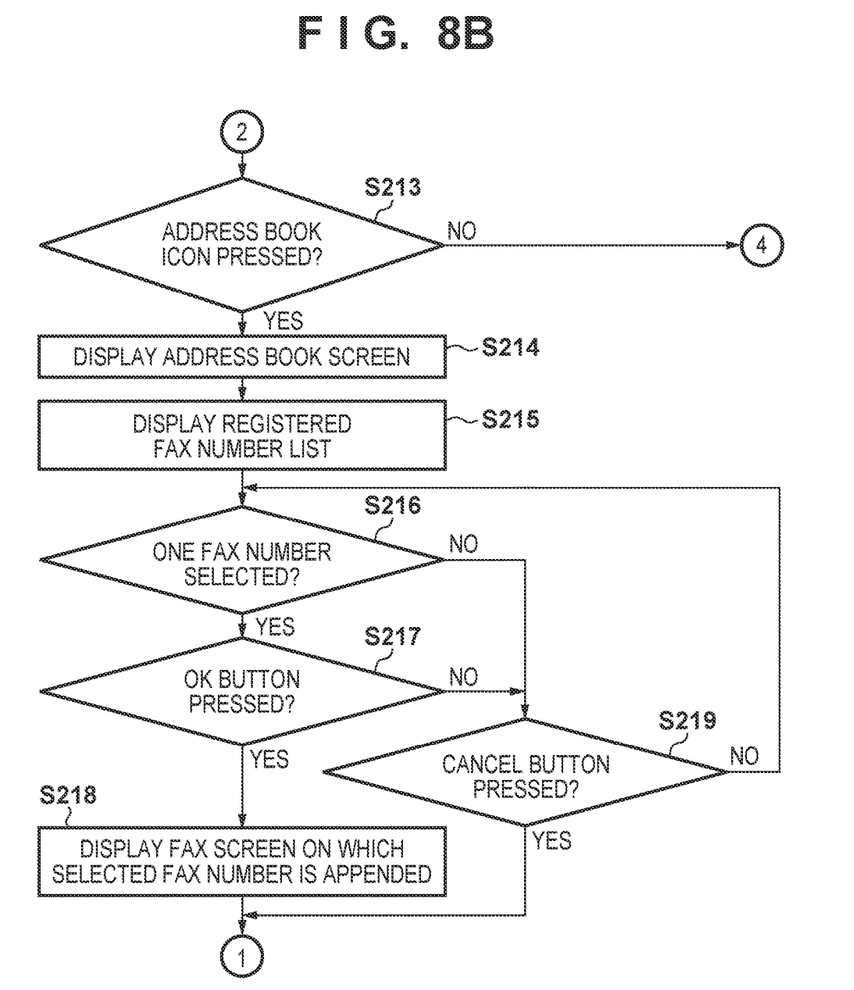
Figure 8C:
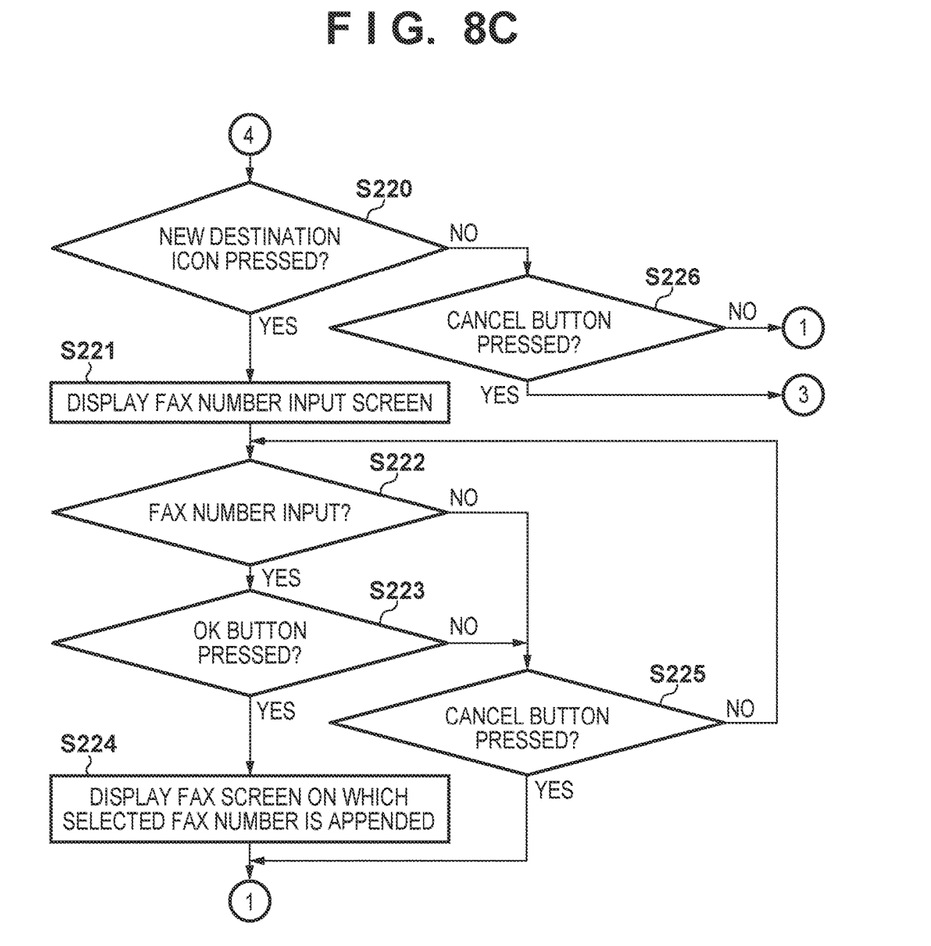

The FAX transmission processing (step S105) according to this embodiment will now be described in detail with reference to FIGS. 8A-8C. The processing to be described below is implemented by causing the CPU 11 to load, onto the RAM 12, the control programs stored in the HDD 13 in advance and execute them.

Upon starting the FAX transmission processing in step S105, first, in step S202, the CPU 11 determines whether the start button 602 on the FAX screen 601 is pressed. If the start button 602 is pressed, the process advances to step S203 in which the CPU 11 determines whether a destination is set in the transmission destination field 607 on the FAX screen 601. If the destination is set, the process advances to step S204 in which the CPU 11 obtains a displayed (selected) FAX number, and advances to step S205. On the other hand, if the destination is not set, the process returns to step S202 to continue the processing.

In step S205, the CPU 11 determines whether a setting for appending an external line number by external line number setting processing to be described later is made. If the setting for appending the external line number is made, the process advances to step S206 in which the CPU 11 obtains the external line number. The CPU 11 appends, in step S207, the external line number to the FAX number obtained in step S203, designates the FAX number to a transmission destination in step S208, performs FAX transmission in step S209, and advances to step S210. On the other hand, if the setting for appending the external line number is not made in step S205, the processing in steps S206 and S207 is skipped, and the process advances to step S208 in which the CPU 11 designates the FAX number obtained in step S203 to a transmission destination. The CPU 11 performs FAX transmission in step S209, and the process advances to step S210.

In step S210, the CPU 11 records, in the HDD 13, the external line number obtained in step S206 and the FAX number obtained in step S204 as transmission histories. Here, only the FAX number is recorded as the transmission history if the processing in step S206 is skipped. When the transmission histories are recorded, in order to allow a FAX number that has actually undergone FAX transmission to be divided into the external line number, and a FAX number obtained in step S204 and set by the user, both data are recorded in different areas on the HDD 13 in a form that they are linked with each other. Then, in step S211, the CPU 11 determines whether the processing is performed on all the destinations set in the transmission destination field 607 on the FAX screen 601. If the processing is performed, the CPU 11 terminates the process. If the processing is not performed, the CPU 11 returns the process to step S202.

Figure 9:
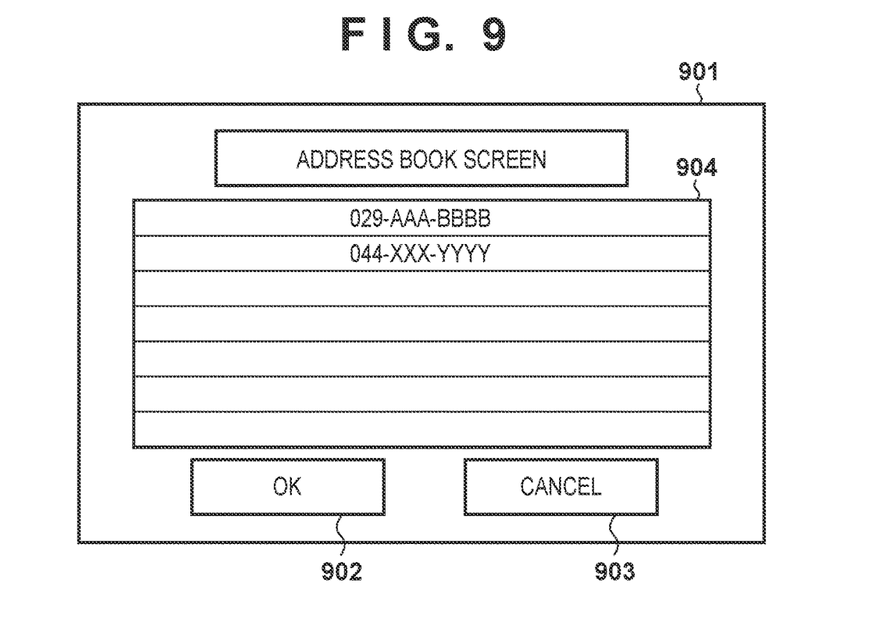
FIG. 9 is a view showing an example of an address book screen according to the embodiment.

If the start button 602 is not pressed in step S202, the process advances to step S213 in which the CPU 11 determines whether the address book icon 604 is pressed, and an instruction to open the address book is performed. If the address book icon 604 is pressed, the process advances to step S214 in which the CPU 11 displays, in the display unit, an address book screen 901 shown as an example in FIG. 9. As shown in FIG. 9, the address book screen 901 includes an OK button 902, a cancel button 903, and a destination list display unit 904 on the address book screen. The destination list display unit 904 on the address book screen selectably displays, for each destination, one or more destinations registered in the address book. Each of the OK button 902 and the cancel button 903 is a button which finalizes or cancels the destination selected in the destination list display unit 904 on the address book screen.

Figure 10:
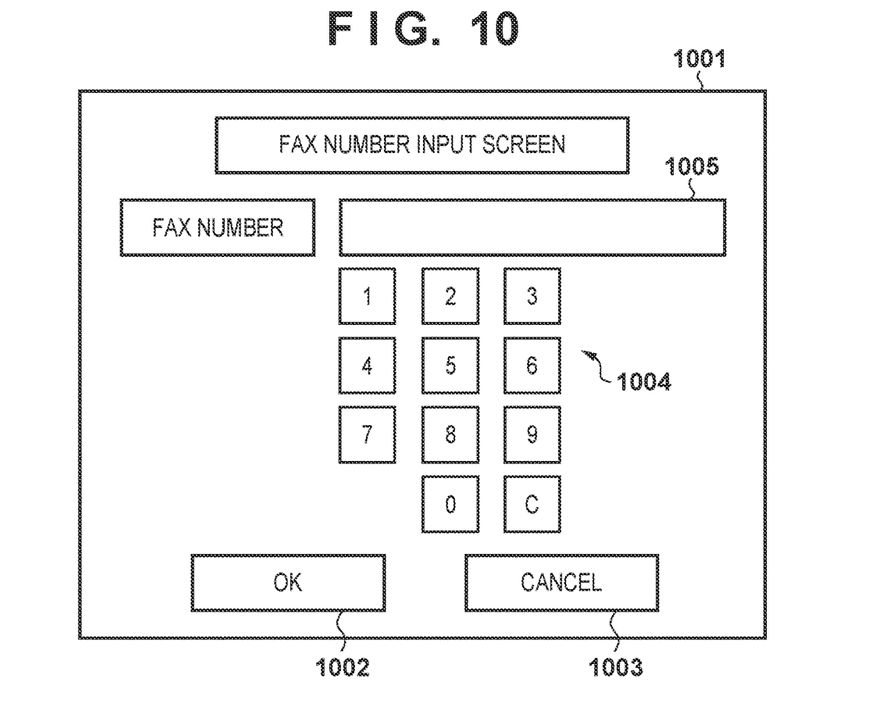
FIG. 10 is a view showing a FAX number input screen according to the embodiment.

Subsequently, in step S215, the CPU 11 obtains FAX numbers from the address book stored in the HDD 13 and displays them in the destination list display unit 904 on the address book screen 901 displayed in step S214. Subsequently, in step S216, the CPU 11 determines whether one FAX number out of the FAX numbers displayed in step S215 is selected. If the FAX number is selected, the process advances to step S217 in which the CPU 11 determines whether the OK button 902 is pressed. If the OK button 902 is pressed, the process advances to step S218 in which the CPU 11 displays the FAX screen 601 on which the destination is added to the transmission destination field 607. On the other hand, if the FAX number is not selected in step S216, or if the OK button 902 is not pressed in step S217, the process advances to step S219 in which the CPU 11 determines whether the cancel button 903 is pressed. If the address book icon 604 is not pressed in step S213, the process advances to step S220 in which the CPU 11 determines whether the new destination icon 605 is pressed, and an instruction to designate a new destination is performed. If the new destination icon 605 is pressed, the process advances to step S221 in which the CPU 11 displays a FAX number input screen 1001 shown as an example in FIG. 10. Subsequently, in step S222, the CPU 11 determines whether a FAX number of one or more digits is input in a FAX number input field 1005. If the FAX number is input, the process advances to step S223; otherwise, the process advances to step S225. As shown in FIG. 10, the FAX number input screen 1001 includes an OK button 1002, a cancel button 1003, a ten-key pad 1004, and the FAX number input field 1005. The ten-key pad 1004 includes buttons for inputting a destination number manually. The FAX number input field 1005 is an area in which the FAX number input by using the ten-key pad 1004 is displayed. Each of the OK button 1002 and the cancel button 1003 is a button which finalizes or cancels the destination number input in the FAX number input field 1005.

If the FAX number is input in step S222, the process advances to step S223 in which the CPU 11 determines whether the OK button 1002 is pressed. If the OK button 1002 is pressed, the process advances to step S224 in which the CPU 11 displays a FAX screen on which the destination is added to the transmission destination field 607 and returns the process to step S202. On the other hand, if the FAX number of one or more digits is not input in the FAX number input field 1005 in step S222, or if the OK button 1002 is not pressed in step S223, the process advances to step S225 in which the CPU 11 determines whether the cancel button 1003 is pressed. Here, the CPU 11 returns the process to step S202 if the cancel button 1003 is pressed and returns the process to step S222 if the cancel button 1003 is not pressed.

On the other hand, if the new destination icon 605 is not pressed in step S220, the process advances to step S226 in which the CPU 11 determines whether the cancel button 603 is pressed. If the cancel button 603 is pressed, the process ends. If the cancel button 603 is not pressed, the process returns to step S202 to continue the processing.

<Transmission History Processing>

Figure 11:
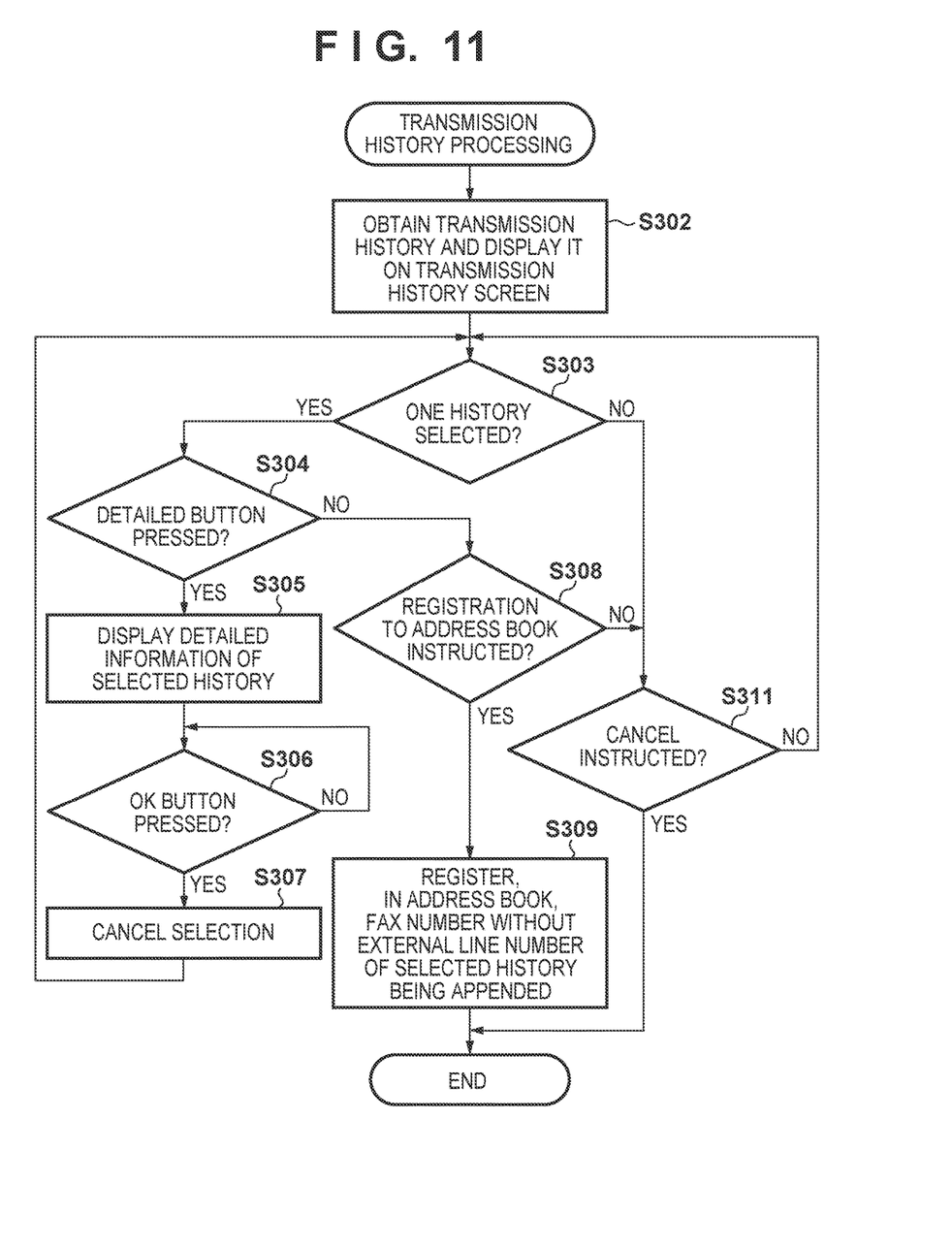
FIG. 11 is a flowchart showing an example of transmission history processing according to the embodiment.

The history processing (step S108) according to this embodiment will now be described in detail with reference to FIG. 11. The processing to be described below is implemented by causing the CPU 11 to load, onto the RAM 12, the control programs stored in the HDD 13 in advance and execute them.

Upon starting the processing, in step S302, the CPU 11 obtains, from the HDD 13, the transmission histories registered in step S210 and displays them in the transmission history list display field 704 on the transmission history screen 701. Subsequently, in step S303, the CPU 11 determines whether one history out of the transmission histories displayed in step S302 is selected and advances to processing in step S311 to be described later if the history is not selected. On the other hand, if the history is selected, the process advances to step S304 in which the CPU 11 determines whether the detailed button 702 is pressed. If the detailed button 702 is pressed, the process advances to step S305 in which the CPU 11 displays, in the display unit, the history detailed screen 1101 shown as an example in FIG. 12 and displays a detailed history. As shown in FIG. 12, the history detailed screen 1101 includes an OK button 1102.

Then, in step S306, the CPU 11 determines whether the OK button 1102 on the history detailed screen 1101 is pressed. If the OK button 1102 is not pressed, a determination in step S306 is repeated. If the OK button 1102 is pressed, the process advances to step S307 in which the CPU 11 cancels the selection of the history and returns the process to step S303.

On the other hand, if the detailed button 702 is not pressed in step S304, the process advances to step S308 in which the CPU 11 determines whether the registration button 703 to the address book is pressed and an instruction to register, to the address book, the FAX number of the selected history is performed. If the registration button 703 is pressed, the process advances to step S309 in which the CPU 11 registers, to the address book recorded in the HDD 13, a FAX number of the history to which the external line number is not appended and terminates the process.

On the other hand, if one history out of the transmission histories is not selected in step S303, or if the registration button 703 to the address book is not pressed in step S308, the process advances to step S311 in which the CPU 11 determines whether the cancel button 705 is pressed. If the cancel button 705 is pressed, the process ends immediately. If the cancel button 705 is not pressed, the process returns to step S303.

As described above, the external line number and the FAX number set by the user are divided and recorded in step S210, making it possible to register, to the address book, only the FAX number input by the user. Two steps of steps S210 and S309 allow the image communication apparatus 1 according to this embodiment to prevent, in a mode also applicable to the FAX terminal, the extra addition of an external line number when redialing from a history. In this embodiment, registration to the address book has been described. However, an embodiment may be adopted in which a FAX number without the external line number of the history being appended is appended to a transmission destination, and a FAX screen is displayed.

<External Line Number Setting Processing>

Figure 13:
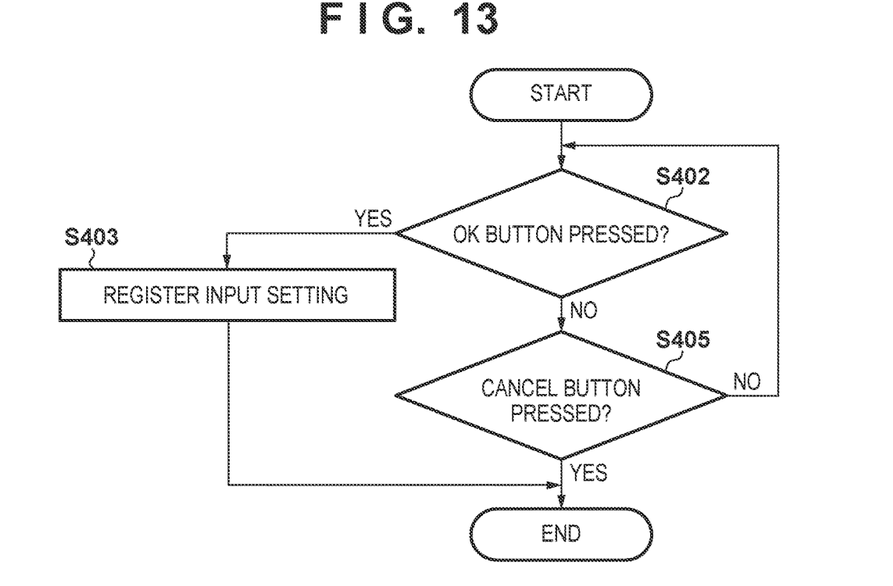
FIG. 13 is a flowchart showing an example of external line number setting processing according to the embodiment.

External line number setting processing according to this embodiment will now be described with reference to FIG. 13. The processing to be described below is implemented by causing the CPU 11 to load, onto the RAM 12, the control programs stored in the HDD 13 in advance and execute them.

Upon starting the processing, in step S402, the CPU 11 determines whether the OK button 802 is pressed. If the OK button 802 is pressed, the process advances to step S403 in which the CPU 11 records, in the HDD 13, contents input to the external line number setting screen 801 and terminates the process. On the other hand, if the OK button 802 is not pressed, the process advances to step S405 in which the CPU 11 determines whether the cancel button 803 is pressed. If the cancel button 803 is pressed, the process ends. If the cancel button 803 is not pressed, the process returns to step S402.

Figure 14:
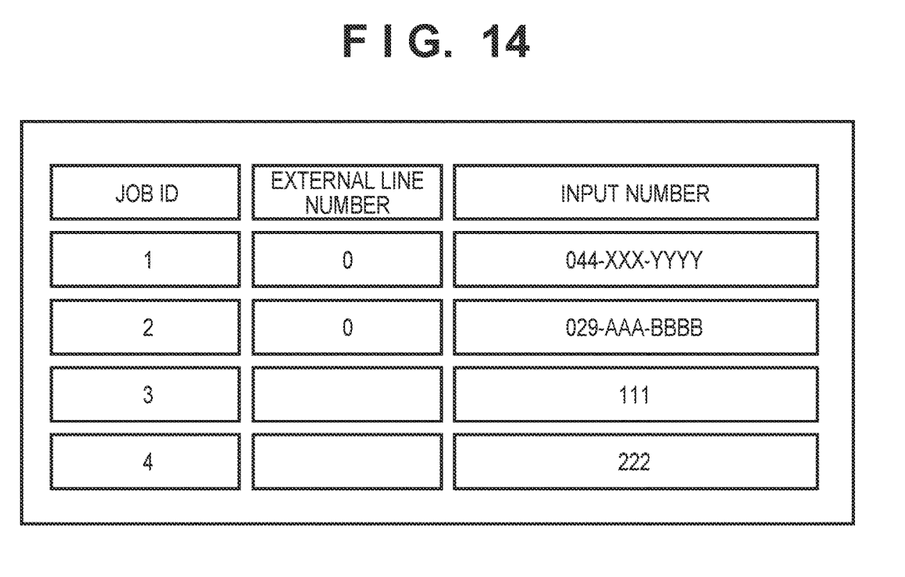
FIG. 14 is a view showing an example of a history registration mode according to the embodiment.

As described above, in this embodiment, a problem in the related art is solved by registering a history in a form shown as an example in FIG. 14 in step S210. That is, as shown in FIG. 14, external line numbers and input numbers are saved separately, and both of them are linked by numbers such as job IDs capable of identifying FAX transmission uniquely. This makes it possible to display the external line numbers and the input numbers when a number that has actually undergone FAX transmission is to be checked and to use only the input numbers when redialing by using the history.

As described above, the image communication apparatus according to this embodiment appends an external line number if a designated transmission destination is the external line and transmits image data in accordance with the transmission destination. Furthermore, in accordance with the transmission destination used when transmitting the image data, this image communication apparatus individually records, as history information for each transmitted job, the designated transmission destination and an external line number if the external line number is appended. This image communication apparatus also registers the designated transmission destination from the history information to the address book. That is, the image communication apparatus registers, to the address book, only a FAX destination from which an automatically appended external line number is removed. This makes it possible to call a right partner and improve reusability of the history even if redialing using the history information is performed in the FAX terminal configured to append the external line umber automatically. That is, according to this embodiment, it is possible to avoid a transmission error by preventing the duplicative addition of external line numbers and to utilize a transmission history more effectively.

Note that the present invention is not limited to the above-described embodiment, but various modifications can be made. In the above-described embodiment, control has been described in which only the designated transmission destination is registered, and the automatically appended external line number is removed when registration from the transmission history to the address book is made. However, the present invention is also applicable to a case in which the transmission destination of image data is designated directly from the transmission history. That is, as in making the registration to the address book, control in which only the designated transmission destination is designated, and the automatically appended external line number is removed can also be performed in a case in which a transmission destination is designated from the transmission history. Note that in this case, on the FAX screen 601, an icon which designates a transmission destination from the transmission history is added and upon selecting the destination, the transmission history screen 701 is displayed. Furthermore, on the transmission history screen 701, a button which performs FAX transmission to the selected destination is added, making it possible to implement control in which the transmission destination is designated from the transmission history.

Second Embodiment

The second embodiment of the present invention will be described below. Processing to be described below is implemented by causing a CPU 11 to load, on to a RAM 12, control programs stored in an HDD 13 in advance and execute them. The processing procedure of transmission history processing according to this embodiment will be described with reference to FIG. 15. Only a difference from the transmission history processing of the first embodiment described above will be described here. The same reference numerals denote the same parts, and a description thereof will be omitted.

Figure 15:
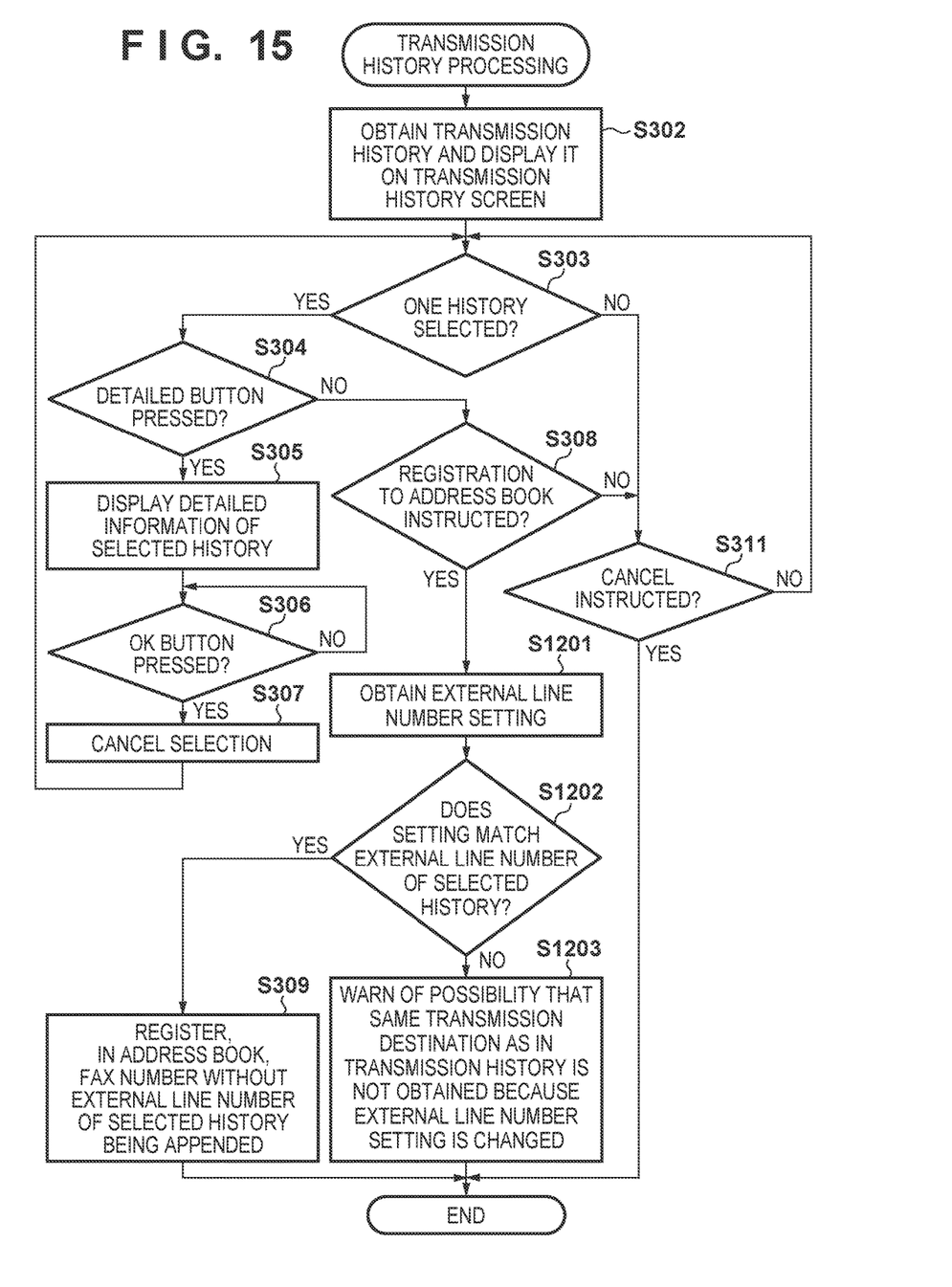
FIG. 15 is a flowchart showing an example of transmission history processing according to an embodiment.

After registration to an address book is instructed in step S308, the CPU 11 obtains an external line number setting from the HDD 13 in step S1201 and determines in step S1202 whether the obtained setting matches an external line number registered in the history. If they match, the process advances to step S309; otherwise, the process advances to step S1203. Here, an external line number appended when a transmission history is recorded in step S210 and a FAX number set by a user are saved in different areas in a format that they are linked with each other, enabling step S1202.

In step S1203, the CPU 11 displays, as a warning in a display unit of a user command input apparatus 14, a possibility that the same transmission result is not obtained because the setting of the external line number is changed from time when FAX transmission of the history is executed and terminates the process. That is, the registration to the address book is restricted by displaying the fact that the external line number is changed.

As described above, according to this embodiment, when a transmission destination is registered from a transmission history to the address book, the CPU 11 refers to a current external line number setting and determines whether the setting matches the external line number of the transmission history. This makes it possible to obtain the same effect as in the first embodiment described above even if the external line number is changed after FAX transmission is performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154023 filed on Aug. 4, 2016, which is hereby incorporated by reference herein in its entirety.

What is claimed is:

1. An image communication apparatus capable of image communication to an external line and an extension line, the apparatus comprising:
    a memory device that stores a set of instructions; and
    at least one processor that executes the instructions to:
    designate a transmission destination of image data,
    append an external line number if the designated transmission destination is the external line,
    transmit the image data in accordance with one of the designated transmission destination and the transmission destination to which the external line number is appended,
    when a transmission of the image data is performed in accordance with the transmission destination to which the external line number is appended, individually record, as history information for the transmission, the designated transmission destination and the external line number,
    set a number as the external line number;
    register the transmission destination included in the history information to an address book if the external line number included in the history information and the set number match, and
    display that the external line number is changed if the external line number included in the history information and the set number do not match when the history information is selected for the address book.

2. The apparatus according to claim 1, wherein the at least one processor further executes the instructions to identifiably display the designated transmission destination and the appended external line number from the recorded history information.

3. The apparatus according to claim 1, wherein the at least one processor further executes the instructions to designate, as the transmission destination of the image data, one of a transmission destination selected from the history information, a transmission destination selected from a transmission destination registered in an address book, and a new transmission destination accepted via a user operation.

4. The apparatus according to claim 3, wherein the at least one processor further executes the instructions to designate the designated transmission destination out of the history information as the transmission destination of the image data when the transmission destination selected from the history information is designated as the transmission destination of the image data.

5. A control method for an image communication apparatus capable of image communication to an external line and an extension line, the image communication apparatus comprising a memory device that stores a set of instructions; and at least one processor that executes the instructions, the control method comprising:
   designating a transmission destination of image data,
   appending an external line number if the designated transmission destination is the external line,
   transmitting the image data in accordance with one of the designated transmission destination and the transmission destination to which the external line number is appended,
   when a transmission of the image data is performed in accordance with the transmission destination to which the external line number is appended, individually recording, as history information for the transmission, the designated transmission destination and the external line number,
   setting a number as the external line number;
   registering the transmission destination included in the history information to an address book if the external line number included in the history information and the set number match, and
   displaying that the external line number is changed if the external line number included in the history information and the set number do not match when the history information is selected for the address book.

6. A non-transitory computer-readable storage medium storing a computer program for causing a computer to execute respective steps in a control method for an image communication apparatus capable of image communication to an external line and an extension line, the image communication apparatus comprising a memory device that stores a set of instructions; and at least one processor that executes the instructions, the control method comprising:
   designating a transmission destination of image data,
   appending an external line number if the designated transmission destination is the external line,
   transmitting the image data in accordance with one of the designated transmission destination and the transmission destination to which the external line number is appended,
   when a transmission of the image data is performed in accordance with the transmission destination to which the external line number is appended, individually recording, as history information for the transmission, the designated transmission destination and the external line number,
   setting a number as the external line number;
   registering the transmission destination included in the history information to an address book if the external line number included in the history information and the set number match, and
   displaying that the external line number is changed if the external line number included in the history information and the set number do not match when the history information is selected for the address book.

\* \* \* \* \*